(12) United States Patent
Johnson

(10) Patent No.: US 7,153,543 B2
(45) Date of Patent: Dec. 26, 2006

(54) REFRACTORY-CARBON COMPOSITE BRAKE FRICTION ELEMENTS

(75) Inventor: David Callum Johnson, Kenilworth (GB)

(73) Assignee: Dunlop Aerospace Limited (GB)

( * ) Notice: Subject to any disclaimer, the term of this patent is extended or adjusted under 35 U.S.C. 154(b) by 0 days.

(21) Appl. No.: 10/153,991

(22) Filed: May 23, 2002

(65) Prior Publication Data

US 2002/0176990 A1 Nov. 28, 2002

(30) Foreign Application Priority Data

May 25, 2001 (GB) ............................ 0112893.3

(51) Int. Cl.
C23C 16/00 (2006.01)
B05D 3/02 (2006.01)

(52) U.S. Cl. .................. 427/249.1; 427/249.2; 427/228; 427/249.5; 427/249.15; 427/331

(58) Field of Classification Search ........... 427/249.1, 427/249.2, 249.3, 249.4, 249.5, 249.6, 249.15, 427/249.16

See application file for complete search history.

(56) References Cited

U.S. PATENT DOCUMENTS

| | | | | |
|---|---|---|---|---|
| 3,547,676 A | * | 12/1970 | Bokros et al. | ............... 427/213 |
| 3,552,533 A | | 1/1971 | Nitz | |
| 3,672,936 A | | 6/1972 | Ehrenreich | |
| 3,936,552 A | * | 2/1976 | Krupp et al. | ............... 428/66.2 |
| 4,119,189 A | | 10/1978 | Ehrenreich | |
| 4,476,164 A | * | 10/1984 | Veltri et al. | ............ 427/249.16 |
| 4,532,091 A | | 7/1985 | Dias et al. | |
| 4,613,522 A | * | 9/1986 | Vasilos | ..................... 427/202 |
| 4,815,572 A | | 3/1989 | Froberg et al. | |
| 5,079,039 A | * | 1/1992 | Heraud et al. | ........... 427/249.2 |
| 5,545,435 A | * | 8/1996 | Steffier | .................... 427/249.3 |
| 6,180,223 B1 | * | 1/2001 | Fisher et al. | ............. 428/317.9 |
| 6,361,722 B1 | * | 3/2002 | Theys et al. | ............... 264/29.2 |
| 6,635,355 B1 | * | 10/2003 | Bianco et al. | .............. 428/469 |

FOREIGN PATENT DOCUMENTS

| | | |
|---|---|---|
| EP | 0 546 001 B1 | 8/1991 |
| EP | 0 887 572 A1 | 12/1998 |
| GB | 2 012 671 A | 8/1978 |
| GB | 2 137 974 A | 10/1984 |
| WO | WO 97/18176 | 5/1997 |
| WO | WO 97/22815 | 6/1997 |
| WO | WO 98/43809 | 10/1998 |

OTHER PUBLICATIONS

Gebhardt et al., Pyrolitic carbon-carbon materials 4th National SAMPE Technical Conference and Exhibit, vol. 4, pp. 507-522.
Jia-Min Lin et al., Preparation and Properties of SiC modified Carbon/Carbon Composites by Carbothermic Reaction; Journal of Materials Science Letters, 19 (1999) 1353-1355.

* cited by examiner

Primary Examiner—Timothy Meeks
Assistant Examiner—David Turocy
(74) Attorney, Agent, or Firm—Caesar, Rivise, Bernstein, Cohen & Pokotilow, Ltd.

(57) ABSTRACT

Refractory carbide particles are located in a defined area of a matrix, specifically silicon carbide particles are encapsulated within a porous matrix or carbon precursor, by locating particles of refractory carbide-forming material or a precursor thereof in a defined area of the matrix followed by depositing carbon within the matrix at a temperature below that of the melting point of the carbide-forming material.

10 Claims, 2 Drawing Sheets

REFRACTORY-CARBON COMPOSITE BRAKE FRICTION ELEMENTS

The present invention relates to a method for the preparation of a refractory carbide-carbon composite material with carbon fibre reinforcement, more particularly to the preparation of a refractory carbide-carbon composite friction disc for aircraft brakes.

The use of carbon-carbon (C—C) composite friction materials with carbon fibres in a carbon matrix is well known and this class of materials have found widespread use in aircraft braking systems where the properties of low density, high heat capacity and ability to retain strength at elevated temperatures are desirable. However, C—C material is also found to have properties that are not desirable in aircraft brake applications such as oxidation at elevated temperatures, low static friction and variable dynamic friction, especially at low temperatures and low speeds. In addition the wear rate at taxi speeds is found to be disproportionately high for the relatively small amounts of energy absorbed at those low speeds. The high cost of the C—C has limited its use as a friction material in non-aviation applications.

Methods of manufacturing C—C friction materials are well known and typically involve a volume of carbon fibres being restrained in a jig, in a mould or by needling before densification by chemical vapour infiltration (CVI) or impregnation and char of carbonaceous pitch and/or resin material. C—C friction materials typically have levels of porosity in the order of 10%–25%.

Methods of manufacturing C—C for brake friction discs have been described in many patents and patent applications including WO 98/43809, U.S. Pat. No. 3,552,533 and technical papers such as Gebhardt et al (Pyrolitic carbon-carbon materials, $4^{th}$ National SAMPE Technical Conference and Exhibition, Volume 4, pp 507–522). A form of non-woven fabric used in the manufacture of C—C brake friction discs is described in GB 2,012,671 and a method for incorporating such fabric into composites is given in EP 0546001 B1.

GB 2,137,974 teaches that Si or SiC can be mixed in the powder form with carbon to produce SiC bodies by a moulding route. U.S. Pat. No. 4,532,091 gives details of porous bodies compacted from carbon with SiC particles being immersed in molten silicon to produce a SiC body.

It is known from EP 0887572A1 that friction properties of C—C can be improved by infiltrating with a refractory carbide forming element. WO 97/22815 and WO 97/18176 describe methods for the manufacture of refractory composite bodies by infiltrating a porous C—C matrix with liquid refractory so that a proportion of the carbon matrix in the C—C is converted to the refractory carbide. An example of a refractory element used is silicon, which in the molten state infiltrates the carbon to react and convert a proportion of the carbon matrix to silicon carbide. Silicon, when molten, wets the surface of carbon very readily and this allows excellent penetration of the silicon along carbon fibres and into fibre bundles known as tows. The ease with which silicon wets carbon aids penetration and diffusion of the silicon through the pores into the body of the C—C.

Such refractory carbide containing composites need final machining, even when near-net shape C—C parts are prepared. However, because of the hard, brittle nature of the refractory carbide, which is uniformly distributed in the matrix, machining of these materials can be very difficult, requiring expensive tooling and resulting in high scrap rates. Areas of aircraft brake discs that are particularly difficult to machine include the drive slots around the inner periphery of the stator discs where the discs are keyed to the torque tube, and the drive slots around the outer periphery of the rotor discs, which are interleaved between the stator discs and keyed to drive bars around the inside of the wheel.

During service in a brake, friction discs are subjected to high stress levels, rapid rates of torque loading and high impact loads over a wide range of temperatures, particularly in aircraft multi-disc brakes. It has been found that refractory carbide-carbon discs of the type known in the prior art are prone to failure during service due to their brittle nature and resulting lack of toughness. Such failures have been recorded in the development of aircraft brakes and automotive brakes.

A friction disc would ideally combine the friction properties of the refractory carbide-carbon composite with the machinability of C—C. U.S. Pat. No. 4,815,572 goes some way to providing such a material by only converting the surface layers of the disc. However, the surface layers in the machined drive areas are also converted to carbide and the converted surface layer provided only extends to a depth of a few mm, restricting the wear life of the brake.

It is one object of the invention to provide a composite article comprising a carbon matrix having within the interior thereof refractory carbide particles in a defined area. A more specific object is to provide such a method whereby the particles are substantially individually encapsulated within deposited carbon.

According to the invention in one aspect there is provided a method of forming a composite article comprising a carbon matrix containing refractory carbide particles, the method comprising the steps of:

a) providing a porous matrix of carbon or carbon precursor material, the matrix comprising a laminate of two or more layers of the material, each layer having particles of a refractory carbide-forming material or precursor thereof distributed over an area thereof; and b) depositing carbon within the matrix at an elevated reaction temperature which is kept below the melting point of the carbide-forming material to form a distribution of the refractory carbide particles within the matrix at that area.

Preferably the method includes the optional step of heat-treating the resulting composite article to graphitise any unreacted deposited carbon.

Preferably the deposition in step b) involves a chemical vapour infiltration (CVI) or like process.

One method of incorporating the refractory is to add it in a powdered form onto layers of carbon fabric, only on the area where it is required. The powder could be left on the fabric or incorporated deeper into the fabric by, for example, applying vibration to the fabric. Layers of fabric with refractory powder added are then built up, one on top of another, until the required weight of fibre and refractory is reached. The layers can then be compressed to the required fibre volume in a jig or by needling. CVI or an impregnation and char route can then densify discs to the required density. This will produce a disc with carbon fibre reinforcement and a matrix containing carbon and the refractory element. The refractory element can react with all or a portion of the available carbon matrix to produce the refractory carbide either during densification or after densification.

Examples of refractory carbide forming elements for incorporation into the C—C include but are not limited to silicon and boron, individually or in combination. The silicon and boron could be incorporated in their elemental forms or as oxides ($SiO_2$, $B_2O_3$ etc), the oxide being reduced by a carbothermic reduction to the elemental form and reacted with the carbon matrix to form the carbide. The reduction of refractory oxides by carbothermic reaction is described by Jia-Min Lin et al (*"Preparation and Properties of SiC modified Carbon/Carbon Composites by Carbothermic Reaction"*; Journal of Materials Science Letters, 18 (1999) 1353–1355).

The refractory could be incorporated into a sheet with a binder or fugitive backing or produced in a fabric sheet form. The sheet could be cut to the required annular shape and interleaved between the carbon fabric layers. The refractory sheets could, for example, be interleaved between every layer of carbon fabric, between every other layer or at whatever interval frequency is required to give a predetermined concentration of refractory in the finished composite. The binder or fugitive backing could be burnt off to leave no residue during the heating stage of the densification cycle, or in a separate heating process prior to the start of the densification cycle.

To aid densification and/or conversion of refractory element to carbide, the binder or fugitive backing could also incorporate a carbonaceous phase such as a pitch and/or phenolic resin, for example. Such materials could be carbonised prior to densification if required. In addition, or alternatively filler material such as graphite powder or carbon black could be incorporated into the binder or fugitive backing with the refractory element. Temperatures selected during processing can result in the refractory and or refractory carbide being present in the solid or liquid phase allowing diffusion and reactions with the carbon matrix to proceed under solid state or liquid state diffusion conditions.

In another aspect there is provided an article comprising a carbon matrix having within the interior thereof refractory carbide particles, which are substantially individually encapsulated within deposited carbon.

Preferably the refractory carbide particles are distributed to form at least one hard-wearing friction region and at least one machinable region.

In another aspect the invention provides a method of forming a composite article comprising carbide particles in a matrix, the method comprising the steps of:
a) providing a porous matrix comprising a laminate of two or more layers of carbon or carbon precursor material, each layer having particles of a carbide-forming material or precursor thereof distributed over an area of the matrix;
b) depositing carbon within the matrix at an elevated reaction temperature which is kept below the melting point of the carbide-forming material whereby the carbide forming material is converted in the solid state to the carbide to form carbide particles within the matrix at that area.

Embodiments of the invention will now be described by way of example only with reference to FIGS. 1 to 3 of the accompanying drawings, wherein.

Figure 1:
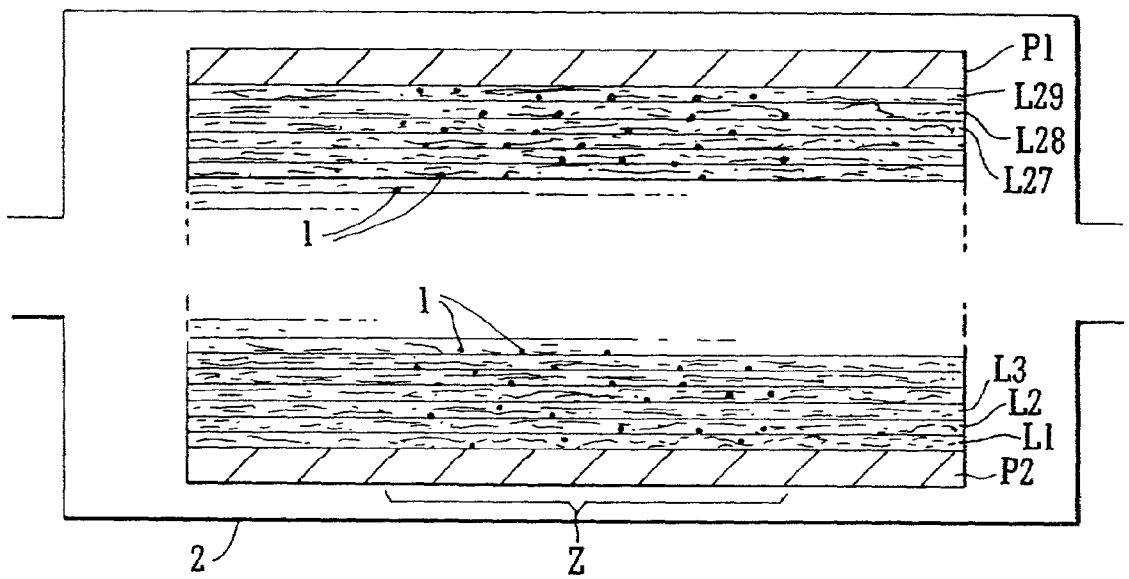
FIG. 1 is a diagrammatic cross-section showing a laminate within a CVI apparatus.

Referring to FIG. 1, a CVI deposition chamber 2 is provided with two opposed graphite plates P1 and P2 which clamp a laminate of 29 layers L1 to L29 of non-woven polyacrylonitrile (PAN) fibres, each layer being held together by a needled staple layer. The fabric is as described in GB 2,012,671. Each layer is in the form of a disc of diameter 83 mm and 1 g of silicon powder granules 1 is provided on the upper surface of each layer except uppermost layer L29 in a central region Z of diameter 51 mm.

This stack of cloth layers is clamped between graphite plates P1 and P2 to a thickness of 35 mm to give a fibre volume of 20% before being subjected to a 300 hour CVI densification cycle using a methane based gaseous precursor under conditions known in the art.

The selective conversion with the refractory carbide-forming elements is carried out by incorporating the refractory element in the selected domains in the body of the composite disc prior to densification. The densification process then 'encapsulates' the refractory to prevent it from diffusing or migrating through the composite at temperatures above the melting point of the refractory and/or refractory carbide.

After densification the composite is removed from between the clamping plates, weighed and the density calculated. The composite is then heat-treated to temperatures in excess of 2000° C. in known manner to graphitise the carbon deposit to optimise thermal properties in the composite before being weighed again for density calculation.

CVI is carried out below 1410° C., the melting point of silicon, and heat treatment is carried out below 2700° C., the sublimation temperature of silicon carbide.

The invention is further illustrated by the following examples:

EXAMPLE 1

A laminate was assembled and processed by the method described above using silicon powder screened to a size of less than 63 micrometre. The density after CVI was 1.74 g/cm$^3$ and the density after the final heat treatment was 1.71 g/cm$^3$.

Micro examination of the resulting sample (Sample I) was then carried out to confirm that the silicon had remained in the region of the sample where it had been placed on the cloth layers. Micro examination was carried out under polarised light to detect any optical activity of the carbon deposit that would indicate the highly graphitisable structure normally obtained with CVI densification.

Figure 2:
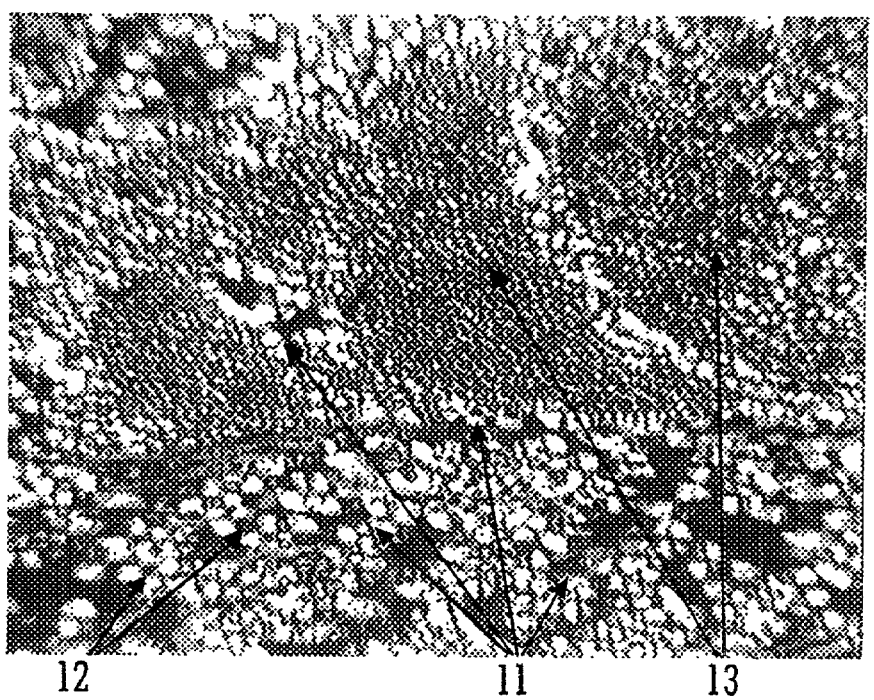
FIG. 2 is a micrograph showing carbon deposited around continuous and staple fibres in the product formed in the apparatus of FIG. 1.

FIG. 2 is a micrograph showing an area of the Sample I composite in the region between the outside edge and where the silicon powder had been placed. Optically active carbon deposit 11 can be seen as light coloured areas around the staple fibres 12 and the bundles of continuous fibres 13.

Figure 3:
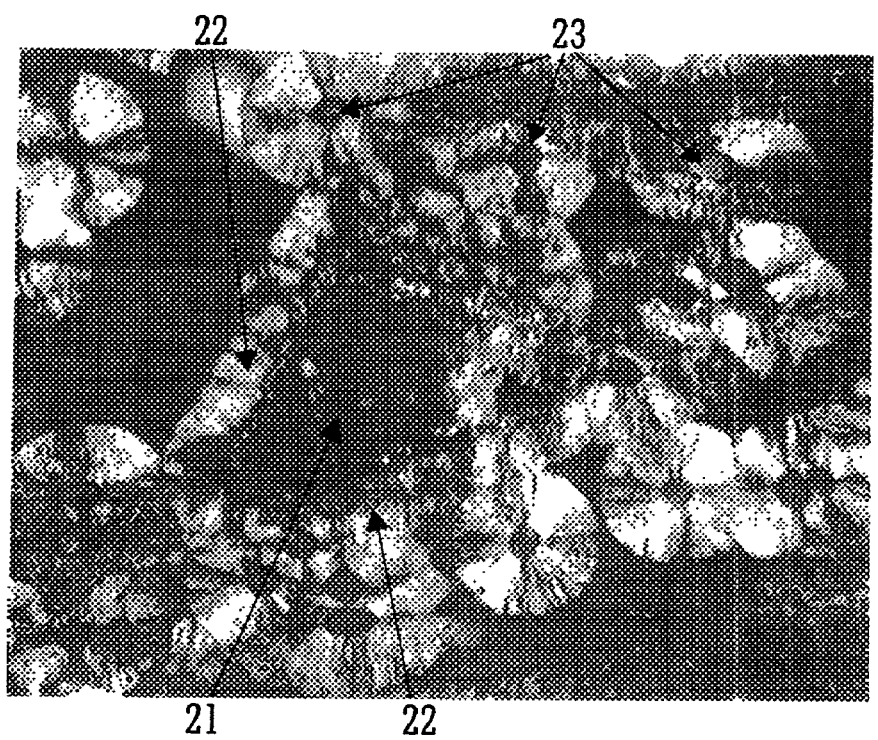
FIG. 3 is micrograph showing silicon carbide in the carbon matrix of the above product.

FIG. 3 shows an isolated silicon carbide particle 21 in the Sample I composite. The particle clearly shows a deposit of carbon 22 that has grown around it to encapsulate the particle. Further carbon deposits 23 on staple fibres can also be seen. This encapsulation prevents the silicon from migrating through the C—C as it would using conventional siliconising techniques. Generally the particles are more densely packed together in the composite than this micrograph would suggest.

EXAMPLE II

The method of Example I was repeated using silicon powder screened with a mesh size of +150 to 250 micrometre. Micrographs of the resulting sample (Sample 2) similar to those of FIGS. 2 and 3 were obtained.

While we do not wish the invention to be limited in any way by the following theory, the angular shape of the silicon carbide particle seen in FIG. 3 suggests that conversion of the silicon to silicon carbide has occurred in the solid state condition, not in the liquid state. Some or all of the reaction to form silicon carbide may have occurred during the deposition cycle and not during the heat treatment cycle.

This suggests a solid state diffusion process is operating as carbon is deposited on the silicon particles during the 300 hour CVI cycle.

Micro examination of the composites showed that the silicon had remained in the volume of the composite in which it had been placed. Deposition of carbon during the CVI process had encapsulated the particles and resulted in conversion to silicon carbide in situ. The silicon had not penetrated into the porosity and fibre bundles as seen in prior art siliconising techniques, resulting in a tougher composite with good machinability in the areas where silicon had not been incorporated.

In each case a central wear-resistant region (corresponding to regions (Z)) was formed within a peripheral C—C region which could be readily machined, e.g. to form a disc brake for an aircraft.

The invention is not limited to the embodiments above. The invention is applicable to other methods of densification and processing conditions known in the art. The invention is not restricted to brake discs for aircraft and could be applied to other friction applications such as automotive and train clutches and brakes, or applications where refractory carbide-carbon composites require the toughness associated with the C—C.

The invention claimed is:

1. A method of forming a rotor disc for a brake assembly, drive slots being present around the outer periphery thereof, the method comprising the sequential steps of:
    a) providing a porous matrix of carbon or a carbon precursor material, the matrix comprising a laminate of two or more layers of the material, each layer having particles of a refractory carbide-forming material or a precursor thereof in an inner region only;
    b) depositing carbon within the matrix at an elevated temperature which is kept below the melting point of the carbide-forming material to form a distribution of carbide encapsulated material only in the inner region, said inner region constituting a wear-resistant region of the rotor disc; and
    c) machining the outer periphery to form the drive slots, said outer periphery that is machined being free of carbide to render said outer periphery readily machinable.

2. A method according to claim 1, wherein the deposition in step b) is a chemical vapor infiltration (CVI) process.

3. A method according to claim 1, wherein the matrix comprises carbon fibre or a precursor thereof.

4. A method according to claim 1, wherein the refractory carbide forming material is boron or silicon or a precursor thereof.

5. A method of forming a stator disc for a brake assembly, drive slots being present around the inner periphery thereof, the method comprising the sequential steps of:
    a) providing a porous matrix of carbon or a carbon precursor material, the matrix comprising a laminate of two or more layers of the material, each layer having particles of a refractory carbide-forming material or a precursor thereof in an outer region only;
    b) depositing carbon within the matrix at an elevated temperature which is kept below the melting point of the carbide-forming material to form a distribution of carbide encapsulated material only in the outer region, said outer region constitution a wear-resistant region of the stator disc; and
    c) machining the inner periphery to form the drive slots, said inner periphery that is machined being free of carbide to render said inner periphery readily machinable.

6. A method according to claim 5, wherein the deposition in step b) is a chemical vapor infiltration (CVI) process.

7. A method according to claim 5, wherein the matrix comprises carbon fibre or a precursor thereof.

8. A method according to claim 5, wherein the refractory carbide forming material is boron or silicon or a precursor thereof.

9. A method of forming a rotor disc for a brake assembly, drive slots being present around the outer periphery thereof, the method comprising the sequential steps of:
    a) providing a porous matrix of carbon or a carbon precursor material, the matrix comprising a laminate of two or more layers of the material, each layer having particles of a refractory carbide-forming material or a precursor thereof in an inner region only;
    b) depositing carbon within the matrix at an elevated reaction temperature which is kept below the melting point of the carbide-forming material whereby the carbide-forming material is converted in the solid state to the carbide with the matrix only in the inner region, said inner region constituting a wear-resistant region of the rotor disc; and
    c) machining the outer periphery to form the drive slots, said outer periphery that is machined being free of carbide, to render said outer periphery readily machinable.

10. A method of forming a stator disc for a brake assembly, drive slots being present around the inner periphery thereof, the method comprising the sequential steps of:
    a) providing a porous matrix of carbon or a carbon precursor material, the matrix comprising a laminate of two or more layers of the material, each layer having particles of a refractory carbide-forming material or a precursor thereof in an outer region only;
    b) depositing carbon within the matrix at an elevated reaction temperature which is kept below the melting point of the carbide-forming material whereby the carbide-forming material is converted in the solid state to the carbide with the matrix only in the outer region, said outer region constituting a wear-resistant region of the rotor disc; and
    c) machining the inner periphery to form the drive slots, said inner periphery that is machined being free of carbide, to render said inner periphery readily machinable.

* * * * *